(12) United States Patent
Peterson et al.

(10) Patent No.: US 7,721,264 B2
(45) Date of Patent: *May 18, 2010

(54) METHOD AND APPARATUS FOR STORING AND REPLAYING CREATION HISTORY OF MULTIMEDIA SOFTWARE OR OTHER SOFTWARE CONTENT

(75) Inventors: Alan R. Peterson, Palo Alto, CA (US); James C. Spohrer, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1946 days.

This patent is subject to a terminal disclaimer.

(21) Appl. No.: 09/844,921

(22) Filed: Apr. 26, 2001

(65) Prior Publication Data

US 2006/0010420 A1    Jan. 12, 2006

Related U.S. Application Data

(63) Continuation of application No. 09/482,745, filed on Jan. 13, 2000, now Pat. No. 6,226,785, which is a continuation of application No. 08/315,726, filed on Sep. 30, 1994, now abandoned.

(51) Int. Cl.
   *G06F 9/44* (2006.01)
(52) U.S. Cl. ...................................... 717/125; 717/109
(58) Field of Classification Search ......... 717/104–113, 717/125, 127
   See application file for complete search history.

(56) References Cited

U.S. PATENT DOCUMENTS

| | | | |
|---|---|---|---|
| 4,696,003 A | 9/1987 | Kerr et al. | |
| 4,755,811 A | 7/1988 | Slavin et al. | |
| 4,790,028 A | 12/1988 | Romage | |
| 4,794,388 A | 12/1988 | Matthews | |
| 4,901,221 A | 2/1990 | Kodosky et al. | |
| 4,931,950 A | 6/1990 | Isle et al. | |
| 5,032,989 A | 7/1991 | Tornetta | |
| 5,075,673 A | 12/1991 | Yanker | |
| 5,081,626 A | 1/1992 | Scott | |
| 5,129,057 A | 7/1992 | Strope et al. | |
| 5,136,690 A | 8/1992 | Becker et al. | |

(Continued)

OTHER PUBLICATIONS

Rangan et al., "Design an On-Demand Multimedia Service", IEEE, pp. 56-64, Jul. 1992.*

(Continued)

*Primary Examiner*—Ted T Vo
(74) *Attorney, Agent, or Firm*—Blakely, Sokoloff, Taylor & Zafman LLP

(57) ABSTRACT

An authoring or other software tool is provided which allows users of the tool to review the creation and evolution of all or part of a content such as a multimedia title created using a tool incorporating the invention. According to the invention, an authoring tool comprises a recording mechanism for recording actions performed during the development or modification of software content in a manner that preserves, directly or indirectly, the relative chronological order of the actions and a playback mechanism for performing or otherwise simulating recorded actions. Preferably, the playback of an action includes annotation using text, recorded or computer-generated voice, video and/or graphic animation. Preferably, an authoring tool embodying the invention allows an author to specify criteria for which actions are to be played back, thereby providing an author with a mechanism for focusing on a particular subset of the recorded actions.

28 Claims, 11 Drawing Sheets

U.S. PATENT DOCUMENTS

| | | | |
|---|---|---|---|
| 5,157,779 | A | 10/1992 | Washburn et al. |
| 5,159,669 | A | 10/1992 | Trigg et al. |
| 5,214,780 | A | 5/1993 | Ingoglia et al. |
| 5,252,951 | A | 10/1993 | Tannenbaum et al. |
| 5,287,489 | A | 2/1994 | Nimmo et al. |
| 5,317,732 | A | 5/1994 | Gerlach, Jr. et al. |
| 5,524,193 | A | 6/1996 | Covington et al. |
| 5,574,843 | A | 11/1996 | Gerlach, Jr. |
| 5,596,695 | A | 1/1997 | Hamada et al. |
| 5,613,909 | A | 3/1997 | Stelovsky |
| 5,754,784 | A | 5/1998 | Garland et al. |
| 5,782,692 | A | 7/1998 | Stelovsky |
| 6,061,062 | A | 5/2000 | Venolia |
| 6,226,785 | B1 * | 5/2001 | Peterson et al. ............ 717/106 |
| 6,366,303 | B1 | 4/2002 | Venolia |
| 6,778,195 | B2 | 8/2004 | Venolia |

OTHER PUBLICATIONS

Hamakawa et al., "Object Composition and Playback Models for Handling Multimedia Data", Proceedings of the first ACM International Conference on Multimedia, pp. 273-281, Aug. 1993.*

Hardman et al., "Structure Multimedia Authoring", Proceedings of the first ACM International Conference on Multimedia, pp. 283-289, Aug. 1993.*

Smith, David Canfield, et al., KIDSIM: Programming Agents Without a Programming Language, Communications of the ACM, Jul. 1994, vol. 37, No. 7, pp. 55-67.

*Apple Media Tool User's Guide*; pp. 1-17; Apple Computer, Inc.; 1993.

*Authorware Professional for Macintosh User's Guide*; pp. 12-17 and 19-67; Macromedia, submitted on Feb. 4, 2002.

Craig, John C.; *The Microsoft Visual Basic Workshop*; pp. xi-xiv; 3-5; 7-13; 15-24; Microsoft Press; 1991.

Goodman, Danny; The Complete Hypercard Handbook, $2^{nd}$ Edition; pp. 17-28, 341-347, 839-841; Bantam Books; 1988.

Harel, David; "Statecharts: A Visual Formalism for Complex Systems"; Science of Computer Programming 8; pp. 231-251; 253-274; North-Holland; 1987.

LabVIEW® 2 Getting Started Manual; pp. 1-1thru 5-1, 5-4 thru 5-5. National Instruments; 1991.

Learning Director for Macintosh; Director Version 4; pp. 1-11; 14-31; Macromedia, Inc.; 1994.

Shu, Nan C.; "Visual Programming"; pp. 178-189, 300-303; Van Nostrand Reinhold Co.; 1988.

* cited by examiner

| action class | other data |
|---|---|
| action class | other data |
| ⋮ | |
| action class | other data |

| action class | order | other data |
|---|---|---|
| action class | order | other data |
| ⋮ | | |
| action class | order | other data |

METHOD AND APPARATUS FOR STORING AND REPLAYING CREATION HISTORY OF MULTIMEDIA SOFTWARE OR OTHER SOFTWARE CONTENT

The present application is a continuation of U.S. patent application Ser. No. 09/482,745, filed on Jan. 13, 2000 and issued as U.S. Pat. No. 6,226,785, which is a continuation of U.S. patent application Ser. No. 08/315,726, filed Sep. 30, 1994, now abandoned.

RELATED APPLICATION

This application is related to co-pending applications entitled "An Authoring Tool Comprising Nested State Machines For Use In A Computer System" and "Method And Apparatus For Capturing Transient Events In A Multimedia Product Using An Authoring Tool On A Computer System", each filed concurrently herewith, which were commonly assigned or subject to an obligation of assignment to the same corporation at the time of invention, the disclosures of which are herein incorporated by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. In particular the claim of copyright protection extends to code and pseudocode in the Appendices and artwork in the FIGURES.

FIELD OF THE INVENTION

The invention relates generally to authoring tools for use on a computer system and, more specifically, to a method and apparatus for recording actions performed while using authoring tools to create or develop content and for replaying those actions or a simulation thereof.

GLOSSARY

"Multimedia computer" refers to an enhanced personal computer equipped to handle digitized video and/or sound data as well as traditional text and graphics data.

"Multimedia workstation" is an enhanced multimedia computer equipped to digitize analog A/V signals into digital video and sound data, as well as being able to process them.

"Software content" or "content" is text, graphics, sound, multimedia products and/or digitally-stored documents or computer programs.

"Software tool" is a computer program designed to create software content.

"Authoring tool" is the software used to create or compose content such as text, graphics, sound, and/or multimedia products; an authoring tool is an example of a software tool.

"Multimedia product" or "title" refers to the final software product to be consumed by general audiences.

"Multimedia author", "content author", or just "author" is the person or team of persons who creates multimedia using authoring tools.

"Tool programmer" is the software developer who develops/creates an authoring tool.

"Novice author" or "novice" or "user" is someone who uses the authoring tool to inspect the inner workings of a multimedia tide.

"Audience" is the group of people for which the title is intended, who we assume has little or no desire to learn about the inner workings of the title.

BACKGROUND OF THE INVENTION

Multimedia computer software products present sounds, graphic images, animations and movies to their users in an interactive environment. Typically, users can explore and revisit different sections of the multimedia product. Usually, a multimedia product is designed so that as a user advances through the content of the product, the user navigates through information, solves puzzles, demonstrates/tests knowledge, or participates in interactive simulations.

The development of a multimedia product is typically achieved through the joint efforts of skilled artists who produce the sounds, images and animations, and skilled software authors who bind together the art, define the interactive relationships between the multimedia product and the user, and codify the behavior of the simulations and games. A software author's job is typically complex, generally entailing a relatively steep learning curve.

Software authors typically use an authoring tool to create or modify a multimedia product. Rather than requiring an exact text-based syntax as is found in a programming environment such as Apple's MPW or Symantec's Think C, authoring tools generally provide a direct-manipulation interface that allows authors to define the behavior of objects by writing a textual description in a simple scripting language, or by rearranging graphic items in a flowchart, state-machine map, score, or other representation. Examples of authoring tools include HyperCard, Authorware Professional, MacroMedia Director, Visual Basic or Apple Media Toolkit. HyperCard and Apple Media Toolkit are available from Apple Computer, Inc. HyperCard and Apple are registered trademarks of Apple Computer, Inc. Authorware Professional and MacroMedia Director are available from Macromedia, Inc. (Director and Authorware are registered trademarks of Macromedia, Inc.). Visual Basic is a registered trademark of Microsoft Corporation.

Today, an end-user of a multimedia product does not generally have the ability to customize the multimedia product to tailor it to her personal uses. For example, an end-user may desire to modify a multimedia product to focus on or to circumvent particular aspects of the product. A teacher may want to focus the multimedia product on a particular topic being taught in class. Similarly, a parent may want to modify a multimedia product so that it is appropriate for the particular age of their child, circumventing puzzles or simulations which are beyond their child's age/capabilities. Thus, it is desirable to have an authoring tool which permits end-users of multimedia products to tailor the products for their individual uses.

For novice authors creating multimedia products and end-users customizing multimedia products it would be beneficial to have a mechanism for learning how to create and modify multimedia products. For example, a novice author would benefit from learning how other authors tackled the task of creating a multimedia product, while end-users would benefit from information on how the particular multimedia product being tailored was created and how it can be modified.

Today, authoring tools do not generally provide a mechanism whereby authors/end-users can discern the creation or evolution process of multimedia products which are produced using that tool. Some of the authoring environments (e.g. HyperCard) allow end-users to inspect the finished code, but this solution only shows the finished work, not the product's evolution nor the process of creation. Thus, these authoring tools do not provide software authors with a mechanism for learning about the development of a multimedia product in order to increase their knowledge and advance their skills. Nor do they provide end-users of multimedia products with a mechanism for learning how to customize the multimedia products.

Additionally, the multimedia products themselves typically do not provide a mechanism whereby the users of the products can discern information related to how the product was created or how it evolved. Generally, users of multimedia products can only observe the finished product or code and based on that information guess as to how the product was created.

Novice software authors, as well as experienced professionals, would benefit by insight into the creation process of multimedia products developed by other software authors. Thus, it is desirable to have an authoring tool which can be used by software authors to gain insight into the creation of multimedia products created using that tool.

Some software applications such as Excel, available from Microsoft Corporation, provide macro recording tools which can be used for capturing sequences of user input. Typically, after a user activates the macro recording tools, user input is recorded until the macro recording tools are deactivated and the recorded user input is stored in a file, called a "macro". By invoking the macro, a user can repeat the same sequence of user input as was recorded in the macro and the computer will behave as if the user had again inputted the same sequence of input. However, the macro recording tools generally do not provide information, e.g. explanations, about what user inputs are being executed, it just executes them.

SUMMARY OF THE INVENTION

The present invention provides an authoring tool for creating and/or modifying content on a computer system that addresses the foregoing limitations associated with currently existing systems, and that provides additional features which facilitate the creation and modification of such content.

According to the invention, authors, i.e. users of the present invention, can review the creation and evolution of all or part of a content such as a multimedia title. An authoring tool incorporating the invention comprises a mechanism for recording the development of a content and a mechanism for replaying all or part of the recording. The recording mechanism records the steps performed during the development or modification of a content in the order in which the steps are performed. The recording mechanism preferably records the steps at a granularity, i.e. level of detail, which provides insight into the creative process and is useful for instructing authors on the development of the content. Desirably, the authoring tool records events at a scale where each action has a meaning, or represents an entire task or action. As part of the granularity, the recording mechanism is preferably designed to record important information, ignoring irrelevant activity. The recording mechanism may provide authors with only a single granularity throughout or it may vary between a plurality of granularities, selecting an appropriate granularity based on context and/or user-specified preference.

The playback mechanism simulates the process of performing each step in the order in which it was recorded and, preferably, includes annotation using text, recorded or computer-generated voice, video and/or graphic animation. The level of details in the replay may vary according to the context in which the replay is occurring. For example, an event can described in some detail the first time it is explained and then later references to that event or similar events can be described in a more general manner.

In an embodiment of creation replay an action class list specifies which action classes, i.e. categories of events or types of events, are recorded by the recording mechanism. For each action class, the action class list further specifies an explanation, verbal, text, video and/or animation, describing the particular action class. When an action is played back, it is preferably accompanied by the explanation associated with the action class of the action.

Preferably, an authoring tool embodying the invention allows an author to specify criteria for which actions are to be played back, thereby providing an author with a mechanism for focusing on a particular subset of the recorded actions.

Creation replay presents several advantages. Authors are provided with a mechanism which they can use to understand the creative process that was used to create or modify a particular content such as a multimedia product. Understanding how content of others is created will usually help authors to advance their own content production skills or to modify the works of others, e.g. the multimedia product for which they are watching creation replay. Moreover, providing annotation along with the playback of the steps supplies authors with helpful information that supplements the simulation of the steps, thereby creating a more educational and instructive environment. End-users of multimedia products can use creation replay to learn about how the multimedia product was created, thereby gaining information on how to modify the product for their own individual uses.

Additionally, by recording the events in the development process at a scale where each action has a meaning, or represents an entire task or operation, rather than recording each and every individual event, the amount of memory resources used to store the creation replay data is reduced. The use of memory resources is further minimized by pruning unimportant activities and periods of inactivity.

Moreover, since the invention allows an author to specify criteria for the playback of the actions, the author can tailor the playback to meet his/her individual needs, thereby increasing the educational value and overall effectiveness of the invention.

In another aspect of the invention, separate user and author views are provided so that an author can manipulate content, e.g. a multimedia product, and simultaneously observe the effect such manipulation has on the content from the user's point of view.

In yet another aspect of the invention, a plurality of modes are provided, each mode being geared toward particular functionality within the invention and a mechanism is provided so that a user of the invention can selectively switch between modes.

These and other features of the present inventions, and the advantages offered thereby, are explained in detail hereinafter with reference to specific embodiments illustrated in the accompanying drawings.

DETAILED DESCRIPTION

To facilitate an understanding of the present invention, its features are described hereinafter with reference to a particular implementation, namely an authoring tool that is designed for creating and manipulating multimedia content. It will be appreciated, however, that the practical applications of the invention are not limited to this particular environment. Rather, it will be found to have utility in any situation in which a software tool is used to edit content. For example, it might be employed in a word processor, a drawing tool, a spreadsheet or a page layout. Moreover, the invention is applicable beyond authoring tools and, among other areas, it can be used, for example, in educational/training software and accounting software.

Figure 1:
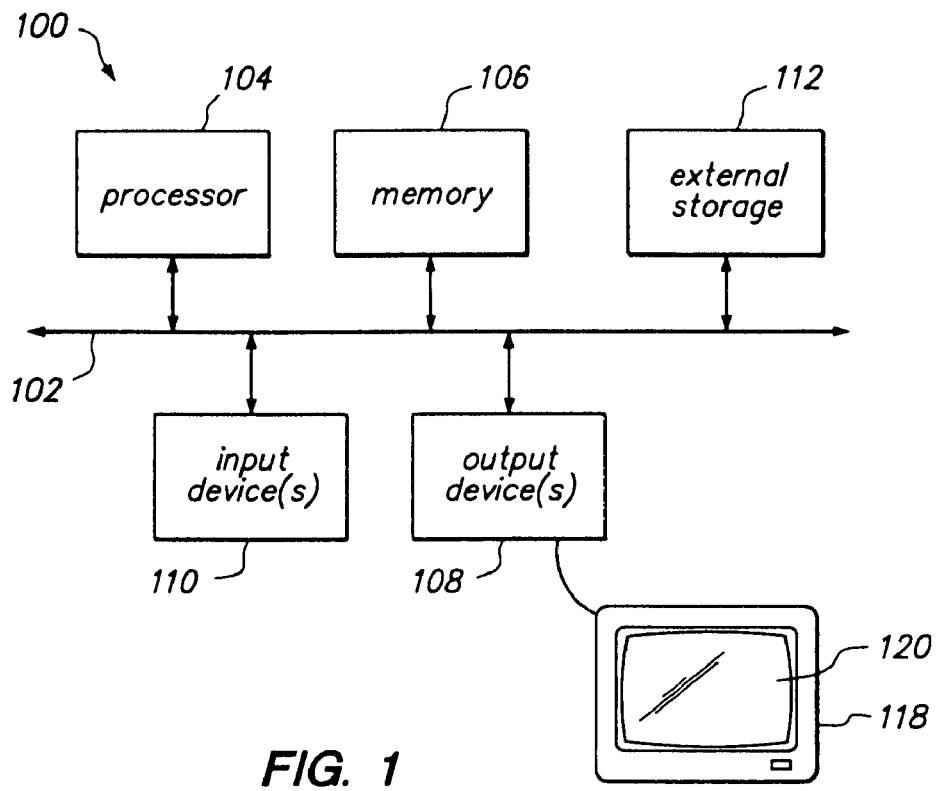
FIG. 1 is a general block diagram of a computer system incorporating the invention.

FIG. 1 illustrates generally one example of a computer system incorporating the invention. Referring thereto, the computer system 100 comprises a bidirectional system bus 102 interconnecting a processor 104 such as a central processing unit (CPU), memory 106, one or more output devices 108 and one or more input devices 110. The memory 106 typically comprises random access memory (RAM) for temporary storage of information and/or read only memory (ROM) for permanent storage.

Optionally, the computer system includes a mass storage unit 112 such as a disk drive which is connected either directly or indirectly to the system bus 102. For descriptive purposes, the memory 106 and the mass storage unit 112 are collectively referred to as "storage" when data can be stored in any type of data storage unit. Moreover, the computer system generally includes as part of its output device(s) an audio unit such as speakers.

The output device 108 is typically a conventional display monitor 118 having a display screen 120. Specifically, information, such as control and data signals, received from the connected input devices is provided via the system bus 102 to the processor 104 for processing, for storage on the mass storage unit 112 or for display on the screen 120. The display device need not be a separate display monitor, but may be housed in the same unit as the processor. For example, the computer system can be a personal digital assistant such as the Newton MessagePad by Apple Computer, Inc. where the display device is a flat liquid crystal display ("LCD") screen.

The input device 110 can be a combination of one or more input or cursor control devices such as a keyboard, a mouse, a trackball, a pen, a pen and pad combination, a touch-sensitive screen, or a sound receiving device such as a microphone.

A mouse typically contains at least one button switch operated by a user of the system. A cursor is displayed on the screen 120 and its position is controllable via the mouse or the keyboard, as is well known. An example of a mouse is shown and described in U.S. Pat. No. Re. 32,632, which patent is hereby incorporated by reference as though fully set forth herein. Herein, the terms "click" and "clicked upon" are used to describe the situation in which a cursor is positioned over an object and a mouse button or key is pressed.

The computer system 100 is preferably a personal computer of the Macintosh® series of computers sold by Apple® Computer, Inc., although the invention may also be practiced in the context of virtually any computer capable of executing a software tool.

Figure 2:
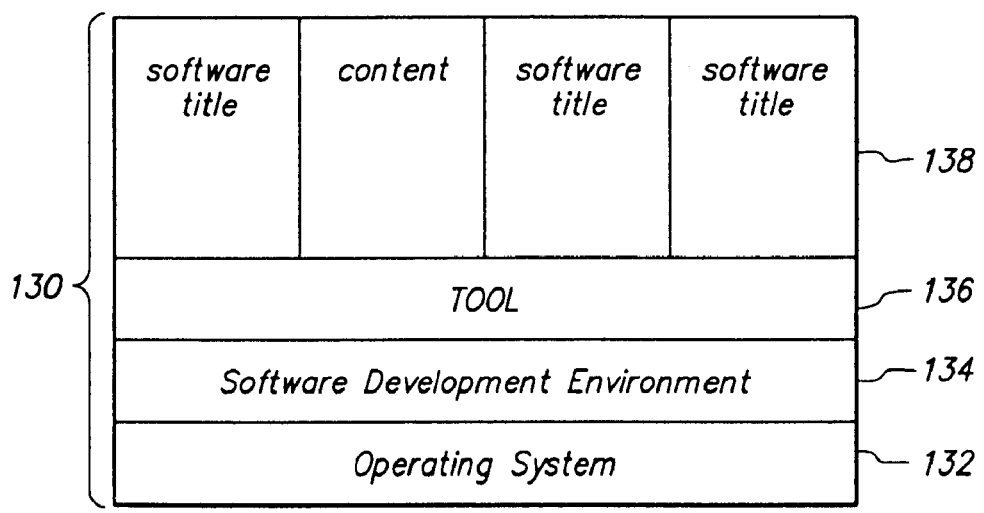
FIG. 2 illustrates software layers of a computer system incorporating the invention.

FIG. 2 illustrates generally the layers of software 130 incorporated into the computer system of FIG. 1 when the invention is incorporated into an authoring tool for multimedia products. The software 130 is arranged in FIG. 2 to reflect the dependencies between the various layers of software. A particular layer of software typically depends on the software at the layers below it and does not depend on software which is at the same layer.

The software 130 is stored in memory 106 or stored in mass storage unit 112 and then loaded into memory when executed. The software 130 includes an operating system 132 for controlling and coordinating the computer system 100. The invention can be applied to virtually any operating system, but, preferably, the operating system, in conjunction with the computer on which it is running, includes the capability to process sound, graphics, video or animation and to provide a windowing environment for display on the display screen 120 (FIG. 1). The operating system can be, for example, a System 7 operating system, developed by Apple Computer, Inc., running on an Macintosh computer such as a Quadra® 800 or a Power Macintosh® 8100, also developed by Apple Computer, Inc. For detailed information on the Apple System 7 operating system refer to the "Inside Macintosh" series published by Addison-Wesley Publishing Co., Inc., in particular "Inside Macintosh", Vol. VI, 1991.

The software further includes a software development environment 134, a tool 136 and one or more multimedia titles 138. If the invention is incorporated into a tool which produces content other than multimedia, then that content is typically positioned in the same manner as multimedia titles 138. The software development environment 134 conceptually lies between the operating system 132 and the tool 136, providing an interface between the two. The development environment 134 is typically present during the creation of the tool 136, but may or may not be present during execution of the tool, depending on the development environment.

Preferably, environment 134 is an object-oriented software development environment such as C++ or SmallTalk. Among others, examples of C++ software development environments include Symantec C++ for Macintosh 6.0, available from Symantec Corporation, and Smalltalk/V for Macintosh 2.0, available from Digitalk. The invention can be implemented in non-object-oriented software development environments by building object models within those environments. The invention can be implemented in virtually any software development environment.

With respect to object-oriented software development environment, as will be understood by those skilled in the art, object-oriented programming, herein called "OOP", techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real world entity in terms of its characteristics, which can be represented by the data elements, and its behavior, which can be represented by its data manipulation functions. In this way, objects can model concrete things like people and computers, while also modeling abstract concepts like numbers or geometrical designs.

Objects are defined by created "classes" which act as templates that the program uses when constructing an actual object. A class may, for example, specify the number and type of data variables and the steps involved in the functions which manipulate the data.

The principle benefits of OOP techniques arise out of three basic principles: encapsulation, polymorphism and inheritance. More specifically, objects can be designed to hide, or encapsulate, all, or a portion of, its internal data structure and internal functions. Polymorphism is a concept which allows objects and functions which have the same overall format, but which work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. The creation of a new subclass which has some of the functionality (with selective modification) of another class allows software developers to easily customize existing code to meet their particular needs.

The tool 136, typically an authoring tool, incorporates the invention. Users of the tool 136 can create, manipulate and execute multimedia products 138. Such users may be authors, novice, expert and those in-between, or end-users of multimedia products 138.

The tool 136 preferably varies the functionality it provides to a user of the tool based on a user-specified preference or the task being performed by the user. In an embodiment of the invention, a plurality of user-selectable modes are provided so that the user can specify to a certain degree the functionality provided by the tool. For example, in that embodiment, the tool 136 can provide two modes: an author mode for creating and editing a multimedia product and a user mode for simply executing a multimedia product. The two modes are provided to the user as selectable or specifiable items in the user interface of the tool 136. Examples of such selectable or specifiable items, include but are not limited to, menu items, buttons, dialog boxes, or typing a secret password.

Figure 3:
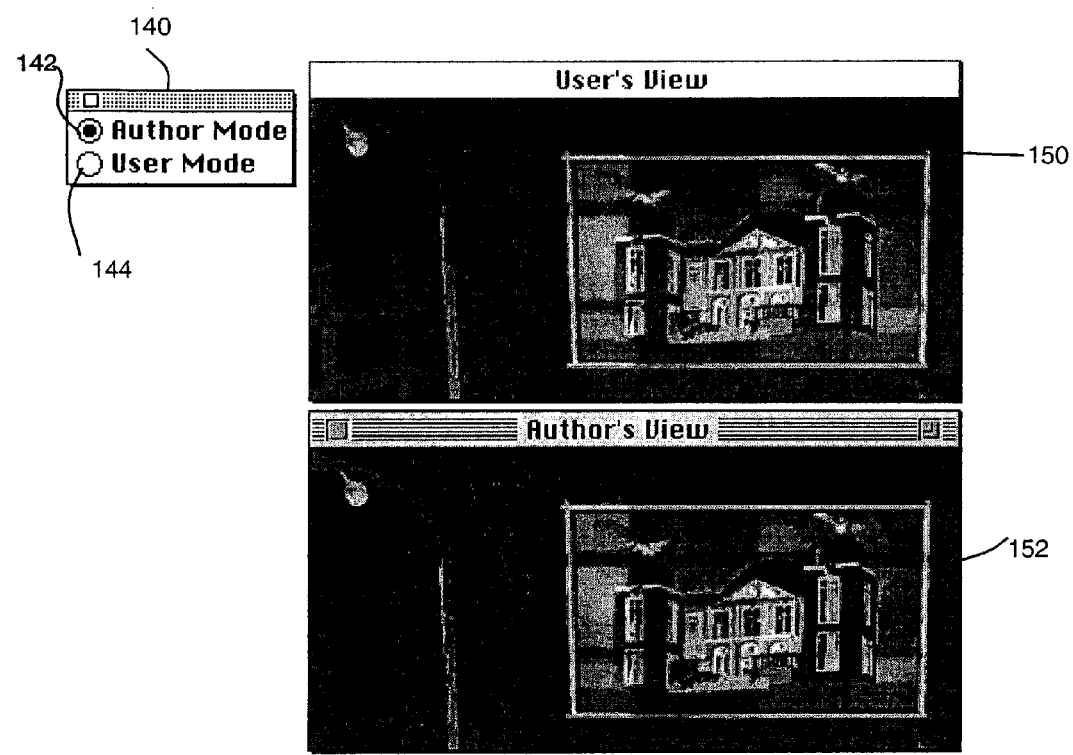
FIG. 3 shows a user interface mechanism for providing user-selectable modes in an authoring tool incorporating the invention.

An example of such selectable items is shown in FIG. 3 wherein a mode window 140 having a first radio button 142 and a second radio button 144 is displayed. A user can selectively switch modes by selecting either the first radio button 142 or the second radio button 144, whichever is appropriate. Preferably, the current mode is indicated by highlighting the appropriate radio button. For example, as shown in FIG. 3, the first radio button 142 is highlighted when the tool 136 is in author mode.

As is understood by a person of ordinary skill in the art, a variety of other methods can be used to present users of the tool 136 with a mechanism for selectively switching between modes.

Preferably, as further shown in FIG. 3, when the tool 136 is in authoring mode, a user's view window 150 and an author's view window 152 are displayed. Each graphic object is represented twice, once in each window, so that every graphic object's view in the user's view window 150 has a corresponding view in the author's window 152. When an object is clicked upon in the user's view window 150, the click event on the object produces a result, e.g. triggering a transition to another state of the object, as it would for an end-user of the multimedia product. For example, clicking on a button object 154a results in the performance of the action associated with that button object. In contrast, when objects in the author's view window 152 are clicked upon they are selected and can be manipulated without the associated action being performed. For example, a button object 154b can be selected and moved to a different location within the author's view window 152 without the clicking of the button resulting in the action that the user would experience. Thus, in the user's window clicking an object results in the performance of the action associated with the object, while in the author's window clicking an object results in the object being selected so that an author can manipulate or modify the object.

In another embodiment of the invention, separate user and author windows are not simultaneously presented on the display screen. Rather, a single view window is used to display the current mode, either user's view or author's view. When the tool is in user mode, the single view window appears and behaves in substantially the same way as the user's view window 150. Similarly, when the tool is in author mode, the single view window appears and behaves in substantially the same way as the author's view window 152.

Figures 4, 5:
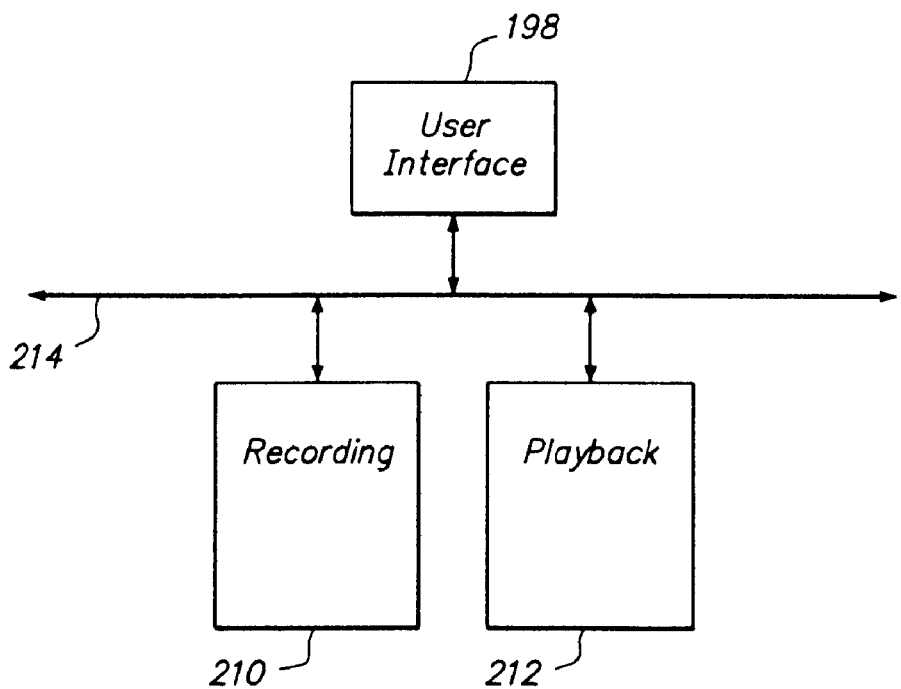
FIG. 4 illustrates generally a block diagram representing a software architecture of a tool incorporating the invention.
FIG. 5 illustrates an action class list.

As shown in FIG. 4, a tool 136 incorporating the invention preferably comprises, in addition to other components of the tool, a user interface module 198, also called "user interface means", a recorder module 210 and a playback module 212. In some implementations, rather than being a separate module, the user interface module 198, or portions thereof, is distributed among the recorder module 210 and the playback module 212.

The tool 136 can be for example, an authoring tool as described in co-pending and commonly assigned patent applications entitled "An Authoring Tool Comprising Nested State Machines For Use In A Computer System" and "Method And Apparatus For Capturing Transient Events In A Multimedia Product Using An Authoring Tool On A Computer System", the disclosures of which are herein incorporated by reference. The tool 136 can also be an authoring tool such as HyperCard, Visual Basic, or Authorware Professional. For detailed information on HyperCard refer to "The Complete HyperCard 2.2 Handbook", fourth edition, Dannyh Goodman, Random House, 1993.

The components 198, 210 and 212 typically interoperate using a defined API and the software development environment 134 (FIG. 2) ensures correct interoperation.

The recorder module 210 is used to record actions while a multimedia product is being created, developed or otherwise modified. The playback module 212, typically in response to a user-initiated request, is used to playback recorded actions to the user.

According to the invention, events are grouped into actions which are recorded and replayed. An event is a low-level, common occurrence such as a cursor movement, pressing or releasing a mouse button or key, inserting a disk, or turning a dial. An action, on the other hand, is typically more complex and context dependent than an event and actually consists of a sequence of one or more events. Conceptually, an action is a goal-directed set of events which has an effect or consequence on the software title or content, thereby progressing the development of the software title or content. Appendix A contains pseudocode illustrating an example of events being grouped into actions.

A default test for determining conceptually whether an event or a series of events qualifies as an action is to determine whether the data that would be stored if the software title or content were saved immediately prior to the event or series of events differs in a significant way from the data that would be stored if the software tide or content were saved immediately subsequent to the performance of the event or series of events. If so, then an action has occurred. Essentially, an action is an event or series of events which results in a change in the data of the software title or content.

For example, the action of moving a graphic object from one location to another using a mouse consists of a sequence of events in which the cursor is positioned over the graphic, the mouse button is depressed, the mouse is moved with button remaining depressed and the mouse button is released. Thus, the sequence of events causes the single action of moving a graphic object to a new location on a display screen, thereby changing the data associated with the location of the object.

Some events are neither actions in themselves nor do they belong to a sequence of events leading to an action. For descriptive purpose these events are referred to as irrelevant events. For example, in a situation where an authoring tool is at a state in which textual input is not accepted, keystrokes typically have no effect on the authoring tool [software title?]. In that case, the keystroke events are irrelevant.

The context in which an event occurs is typically an important factor in determining whether an event is in itself an action, part of a sequence of events forming an action or irrelevant. For example, the event of depressing a mouse button is usually irrelevant when the cursor is positioned over an unoccupied portion of the display screen. However, if the cursor is positioned over a graphic object then the depression of the mouse button might in itself be in an action, e.g. if the graphic object is an OK button, or it might be part of an event sequence leading to an action, e.g. part of the action of moving the graphic object to a new location.

Typically, the designer/programmer of the tool 136 decides what events are in themselves actions, what events are irrelevant and what sequences of events lead to actions Preferably, the designer/programmer bases these decisions on criteria which promotes and enhances the instructional effectiveness of the creation replay mechanism. A designer/programmer can use the default test for determining what constitutes an action or she/he can devise other tests which are more suitable to the particular tool being developed and the context in which the tool will be used.

It is likely that an author or other person using creation replay to learn about another author's creative/development process is more interested in the high-level action of moving a graphic to a new location, rather than the individual mouse events which were performed to effect the move. Thus, organizing events into actions and recording and replaying actions, rather than each and every individual event, creation replay provides a mechanism which is likely to provide an author with information at a level which is both interesting and instructive, thereby increasing the likelihood that the author will learn from the creation replay and be able to incorporate that knowledge into his/her own skill base.

In an embodiment as described hereinafter it is assumed that the action being recorded is performed prior to the invocation of the recorder module. A "handler" is a portion of a program, e.g. subroutine or function, that responds to an event in any given context. It is typically the handler of an action which notifies the recorder module that an action has occurred.

Preferably, as shown in FIG. 5, an action class list 250 is maintained in storage. An action class is a template for holding relevant information when an instance of an action class is recorded. For example, an action class might be "align-selected objects" or "change-the-text-of-a-button". The template of an "align-selected objects" action class might hold, for example, information about the orientation of the alignment of the objects and which objects were aligned.

The action class list 250 comprises a plurality of action class description fields 252, each action class field having a first field 254, also called an action class field, for specifying a particular action class, and a second field 256, also called an explanation field, for specifying a generic explanation of the action specified in the corresponding action class field. Typically, the action class list 250 is used by the recorder module (210) to determine which actions to record. Thus, the action class list 250 preferably includes an action class description field for substantially all of the action classes for which the authoring tool is to provide creation replay. The action class list 250 can be implemented using any data structure capable of representing a list, e.g. an array, a linked or doubly-linked list, or a tree. The use of the term "list" herein does not necessarily imply an ordering of the elements in the list, but simply denotes a collection of elements.

Optionally, rather than directly specifying the explanation, the explanation field identifies a function or software routine that is capable of producing an explanation based upon the properties of a recorded action. For example, if an action class is "change-color-of-an-object" such that the action class encompasses actions which change the color of an object, the explanation field 256 for that action class can identify a software routine/function which accepts as parameters a color and an identification of an object. The parameters are then used to customize the explanation so that it describes which object was changed and to what color the object was changed.

In an embodiment of the invention, the size of the action class list is optimized by arranging action classes in a hierarchical or tree-like fashion such that an action class contains a plurality of other action classes, called "sub-action classes". Among other data structures, data structures well-known in the art for representing data trees can be used to maintain the hierarchy. The action class list can then represent one level of the tree. Explanations can be stored in the action class list on an action class description field basis, as previously described or the explanations can be stored on a sub-action class basis, accessible through the tree data structure.

For example, consider the action class "move object". The action class can contains sub-action classes "move object from X to Y", "align objects vertically", "align objects horizontally". Rather than having an action description field for each sub-action class, the action class list has an action description field for the action class "move object".

A variety of methods can be used to determine whether to record a sub-action class. In one method, the ancestral class action at the level represented in the action class list is first determined and then the action class list is searched. Alternatively, as the action class list is being searched, each action in an action class description field is examined for sub-action classes until an action class which matches the current sub-action class is found.

Figure 6:
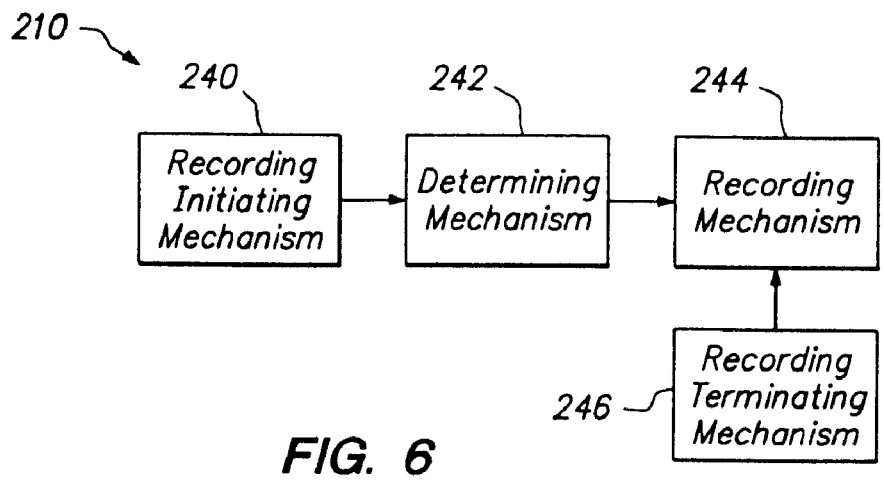
FIG. 6 depicts generally a block diagram representing a software architecture of the recording module of FIG. 4.

As shown in FIG. 6, the recorder module comprises means 240 for initiating recording, means 242 for determining whether there is an action to record, means 244 for recording an action, and means 246 for terminating recording, the initiating and terminating means responsive to a selection means which is preferably user-driven and which allows a user to selectively turn recording on and off. Optionally, the recording initiating means 240 comprises means for storing a current state of a software title.

Figure 7:
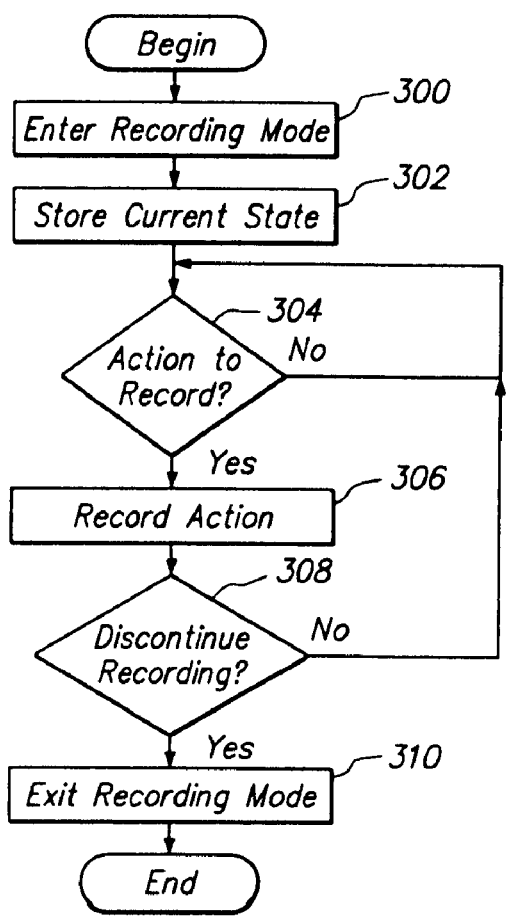
FIG. 7 is a flowchart generally depicting the steps performed by the recording module of FIGS. 4 and 6.

The process performed by the recorder module 210 (FIG. 4) is shown generally in FIG. 7. Generally, when the recorder module 210 records an action, an instance, otherwise known as a record, of the action class to which the event belongs is created and information important to that action is stored in the record. For example, if an author selects several graphic objects and then aligns them by choosing an "align objects" menu item from a menu, an instance of the "align-selected-objects" class is created. Among other information, a reference to the graphic objects which were aligned is stored in the record, along with the new and original locations of those objects on the display screen.

More specifically, with reference to FIG. 7, at block 300, recording mode is entered. This action is generally initiated in response to a user's act indicating that it is appropriate to begin recording events. Examples of such initiating acts, also called "recording initiating mechanisms" include, but are not limited to, selecting authoring mode or selecting a recording button or menu item.

Optionally, when recording mode is entered, at block 302, a snapshot is taken of the current state of the software tide being created so that this state can be restored at the beginning of the playback of the recorded actions. Sufficient data is stored so that the current software title's state can be reconstructed. Such data includes, but is not limited to, substantially all relevant internal memory data structures. Essentially, the same data is stored here as would be stored when saving the software title to storage.

Alternatively, rather than storing the current state at block 302, the recorder module can be constructed so that each action recorded is reversible. In other words, with each recorded action enough data is stored so that the action can be undone, thereby restoring the environment to how it was immediately prior to the performance of the action. At the beginning of the playback of the actions, the actions to be played back are reversed in reverse chronological order until the state that the software title was in at the beginning of the recording of the actions is reconstructed. Preferably, a user is presented with the reconstructed software title's state and not with each of the reversals, i.e. the reversals are performed internally and not displayed to the user. When the reversal mechanism is to be used during playback, block 302 is skipped during recording. The procedure of reversing commands is well known in the art At block 304, it is determined whether there is an action to record. This determination includes two parts: first, whether there is an action, and second, if so, whether to record the action. A variety of alternative methods can be used to make the first determination. For example, at block 304 the tool can wait for notification that an action has occurred. In that case, the actual determination as to whether an action has occurred is typically performed by the individual handler for an action. Typically, while developing/implementing a tool, a tool programmer is aware of what events or sequences of events cause a change in a software tide or content produced using the tool such that an action has occurred and at those points can insert code which will notify the recorder module when that action occurs. Thus, it is within the discretion of the tool programmer as to what events and event sequences constitute actions. These determinations are typically based on the tool's purpose, functionality and, optionally, the sophistication or other characteristics of the ultimate users of the tools, i.e. authors or end-users.

Alternatively, at block 304, the tool can actively poll the operating system event queue to see if an action has occurred. The latest event, in the context that it occurred, will be the beginning or end of an action. As previously discussed, the determination as what events or event sequences constitute actions can be made using the default test or any other appropriate test devised by the tool programmer.

The second determination as to whether to record an action typically includes a look up in the action class list to determine whether the action is an instance of an action class that is to be recorded. Optionally, additional filters can be applied at this step to further limit or focus the actions which are recorded. The filter can be, for example, a list separate from the action class list which specifies a subset of action classes to be recorded. For example, consider an action such as sending the contents of the screen to a printer. While developing a title, an author may perform the printing action often. However, the action of printing is substantially irrelevant because it has virtually no effect on and is incidental to the development process. Although the tool is able to record these actions, an author may opt to filter out the printing actions so that they are not recorded.

If an action to be recorded occurs and it passes any applied filters, then at block 306, the action is recorded. If an action to record has not occurred at block 304, or if the action to record does not pass the filter, then control remains at block 304 until such an action does occur.

At block 306, an instance of the action class to which the action belongs is recorded in a recorded actions list such that its order of occurrence relative to previously and subsequently occurring actions is preserved.

After the event is recorded at block 306, it is determined at block 308 whether the event which was recorded at block 306 indicates the discontinuation/termination of the recording operation, e.g. the user switched out of author mode. If so, then record mode is exited at block 310. If not, then control returns to block 304.

Figures 8A, 8B, 8C:
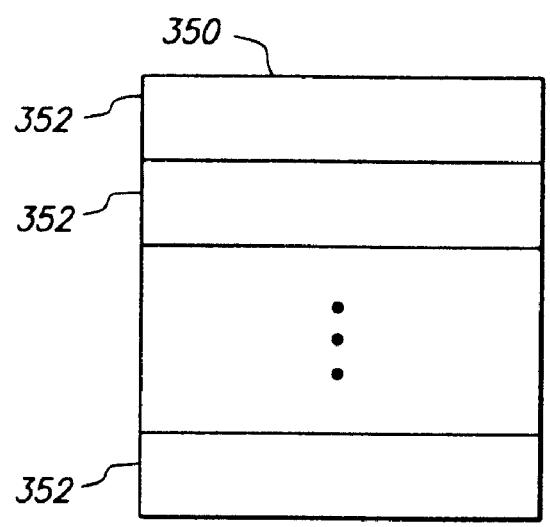
FIGS. 8A-8C illustrate a recorded actions list.

FIG. 8A illustrates a recorded actions list 350. The recorded actions list 250 comprises one or more action nodes 352. The recorded actions list may or may not be chronologically sorted during recording, depending on the embodiment of the invention. In a first embodiment of the invention, a chronologically sorted recorded actions list is typically maintained as actions are recorded. For example, the record actions list can be a doubly-linked list where the action being recorded is added to the end of the list. In a chronologically sorted record list, the order of occurrence of the actions is implicitly maintained by the positioning of the recorded actions 252 in the list.

In a second embodiment of the invention, the recorded actions list is not sorted during the recording of the actions. Information regarding the order of occurrence of the actions is stored or otherwise maintained so that the information can be subsequently used to sort the recorded actions list before playback of the recorded actions. The sorting can occur at any time after the recording is completed. For example, the list can be sorted after recording is complete or it can be sorted between receipt of a playback request and the actual playback of the recorded actions.

For each action being recorded, the corresponding action node 352 in the recorded actions list 350 specifies either directly or indirectly the action class of the action and the order of occurrence of that action relative to other recorded actions. In a sorted recorded actions list, the order is implicitly recorded by the location of the recorded action in the event list. An action node 352 preferably contains further information which is specific to the action class of the event being recorded.

FIG. 8B illustrates a sorted recorded actions list 350b having a plurality of event nodes 352b, each event node describing a particular recorded action, while FIG. 8C depicts an unsorted actions list 350c having a plurality of event nodes 352c, similar to event nodes 352b, but including additional information explicitly indicating the chronological order of occurrence of the actions described by the event nodes in the unsorted recorded actions list. An action node 352b and 352c has a first field 356b and 256c, respectively, also known as a class identifier, for specifying an action class. In FIG. 8C, an action node 352b further includes a second field 357, also known as an order field, for indicating the relative order of occurrence of the action being recorded in the action node. For descriptive purposes, the action-class specific information is generally referred to as "other data" 358b and 358c in FIGS. 8B and 8C, respectively. Depending on the action class, an action node 352 (FIG. 8A) may or may not contain other data 358.

In an unsorted list 350c, a counter can be used to keep track of the order in which actions occur. When an action is recorded, the order field is set to the value of the counter and the counter is incremented. This is an example of one of a variety mechanisms that can be used to keep track of the order of actions.

As previously mentioned, the other data specified by an action node depends on the action class to which the action belongs. Preferably, the other data includes information which is relevant to the particular action being performed and which will aid in the playback of the action and in the educating of those watching the playback. For example, when an action is being performed, it is typically helpful to record what action is being performed and what objects, if any, are affected by the action. It might also be useful to know how the objects, if any, are affected, if the effect is not obvious from the action itself.

For example, for a "menu selection" action class which includes actions such as selecting a menu item from a menu, the action of selecting a menu item and the identification of the selected menu item are relevant data. For an action performed in a draw tool such as a "color object" action class, it is relevant data that an object has been colored, which object was colored, to what color the object was changed and, possibly, what was the original object's color. The object's original color is particularly important where the playback first internally reverses the actions it will playback in order to reconstruct an initial state.

Another example, is a "move object" action class which encompasses actions in which an object is moved from a first location x to a second location y on the display screen. In that case, the relevant other data includes an identification of the object, location x and location y. The action, e.g. moving the object, is typically implicit in the action class, e.g. the "move object" action class.

If the action is not implicit in the action class, then it can be specifically indicated in the other data. This is particularly useful in an embodiment where action classes are grouped together.

Similarly, for an "edit dialog" action class, which includes editing values of properties of an object being edited, the other data includes the fact that edits were made, the old values and the new values. Note that the exact definition of each action class depends upon the features and capabilities of the tool, e.g. the actions users of the tool can perform, and the choices of the tool programmer as to what constitutes an action in various contexts.

In addition to or as a replacement of the explanation in the action class description fields of the action class list, the authoring tool can record an explanation with each individual action. In this embodiment, the authoring tool, preferably, allows an author of a multimedia tide to input an explanation for each action as it is being recorded. For example, if the author aligns some objects on the screen, the recorder module prompts the author for an explanation and the author types in or voice-inputs an explanation for that particular event, e.g. "Aligned these objects so they appear to be resting on the table." In another example, the author can video recording the actions being performed and store with each action a digitized video of each action being performed. In this embodiment, the explanation can be stored either in the other data portion of an action node or stored in another area of storage with a reference to it being stored in the other data portion.

Once actions are recorded using the recorder module 210 (FIG. 4, those actions can be played back using the playback module 212 (FIG. 4). Actions recorded in the recorded event list which were performed in the creation or modification of the multimedia product, or an indicated portion thereof, are played back in chronological order such that they are played back in the same order in which they originally occurred.

Figure 9:
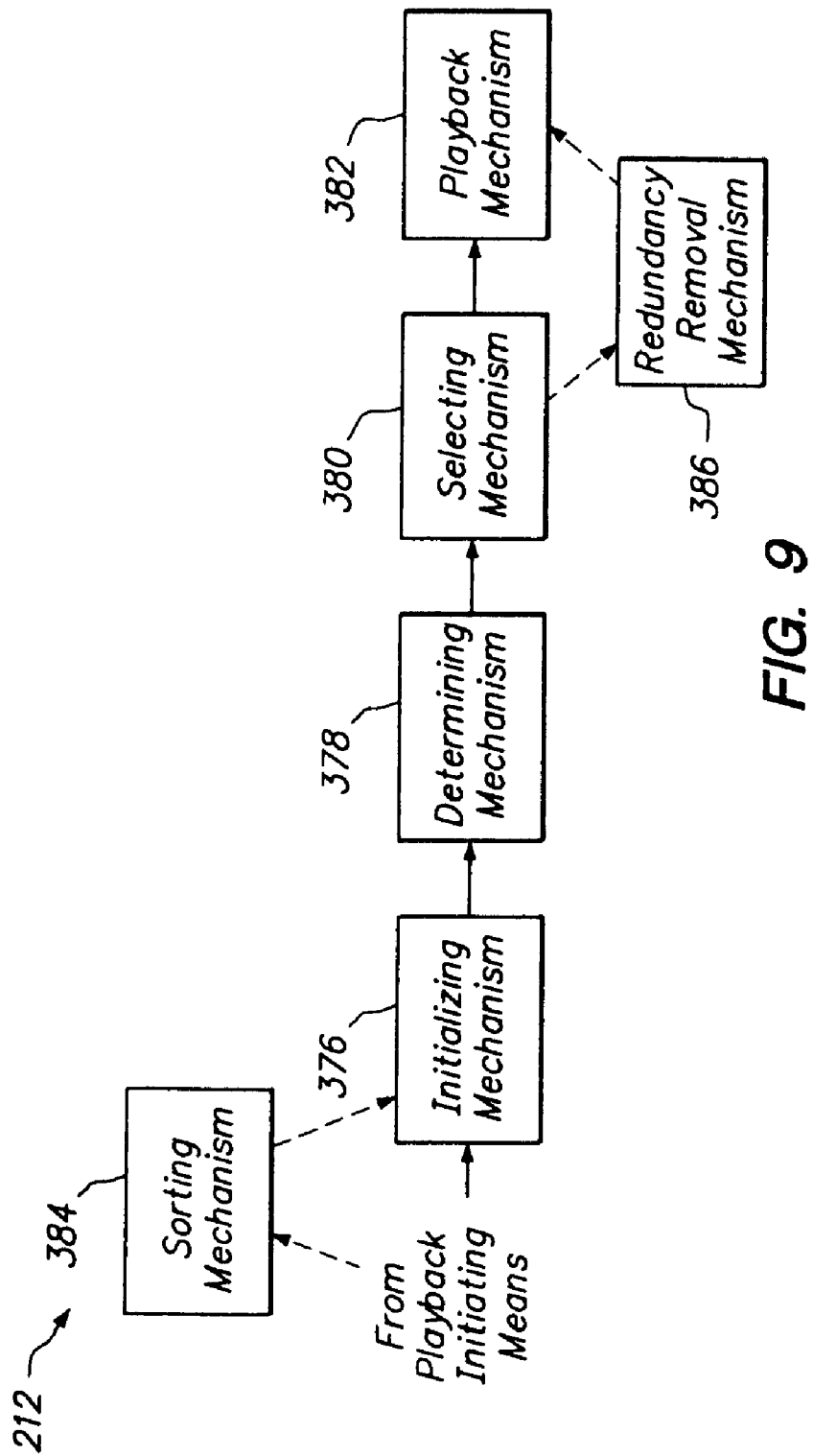
FIG. 9 is a block diagram generally representing a software architecture of the playback module of FIG. 4.

As shown in FIG. 9, the playback module 212 comprises an initializing means 376 for initializing the displayed software title for playback, means 378 for determining if at least one action remains to be played back, a selection means 380 for selecting which actions are to be played back and a playback means 382 for playing back one or more recorded actions. Optionally, the playback module further comprises a sorting means 384 for sorting the recorded actions list and/or a redundancy removal means 386 for preventing the playback of redundant actions and for summarizing a sequence of redundant actions into a single action and replacing that single action for the redundant actions such that the single action is played back instead. Appendix B contains pseudocode for an example of redundant actions being summarized into a single action.

Preferably, the selecting means 380 allows an author to specify one or more criteria that actions generally must meet in order to be played back. Examples of criteria which can be specified include, but are not limited to, particular action(s), actions on particular object(s), and particular number of actions. For example, an author may want actions played back from the creation of a particular object or may want actions played back which relate to the creation of objects on a particular screen. Likewise, an author may want the last 5 actions replayed or may want the first 10 actions replayed.

The selecting means 380 in combination with the user interface module 198 (FIG. 4) may present an author with selectable criteria options and/or may let an author arbitrarily specify criteria. For example, a menu with user-selectable menu items can be displayed where each menu item corresponds to specific criteria for selecting actions to be played back.

The selecting means 380 also determines which recorded actions to play back, e.g. which actions meet the specified criteria, using any one of a variety of methods, or combination thereof In a first method, the selecting means 380 searches the recorded actions list 350 (FIGS. 8A and 8B), examining action nodes and comparing them to the specified criteria until each action node having the potential to meet the criteria has been examined. For example, if the criteria is to play the last five create object actions, then the recorded actions list 350 is searched starting with the action node of the last recorded action and is traversed until five create object actions are found.

In a second method, criteria data structures are maintained for specific criteria. A criteria data structure specifies which recorded actions in the recorded actions list satisfy the particular criteria. For example, a criteria data structure for the "create object" actions references each recorded "create object" action. To playback the actions meeting specified criteria, the selecting means 380 determines which criteria data structure pertains to the specified criteria and then uses the information in the criteria data structure to play back the actions meeting the specified criteria. For example, if the criteria specified is the last five "create object" actions, then the playback means would determine which of the "create object" actions referenced by the "create object" action's criteria data structure were one of the last five actions and then playback those actions in chronological order.

Criteria data structures can also be maintained for each user-manipulatable object so that when the specified criteria is actions based on a particular object, the recorded actions are readily accessible.

The criteria data structures can be created by the recorder module while the actions are being recorded or they can be constructed by the playback module before the playback of any actions. The second method is particularly useful when authors are restricted to a fixed set of specified criteria.

In an environment which presents an author with a fixed set of selectable criteria and also allows an author to input any other arbitrary criteria, the first and second method can both be used. Criteria data structures are maintained for the fixed set of selectable criteria. If the specified criteria is one of the fixed set of selectable criteria, then the second method is used to determine which actions fit the criteria. Otherwise, the first method is used.

The first and second methods can be similarly combined to provide criteria data structures for commonly specified criteria. In that case, the second method is used for the commonly specified criteria and the first method is used for the other criteria.

Alternatively, a tool programmer may design an authoring tool so that a fixed set of criteria are used by the selecting means to select which actions are to be played back and the fixed set is not editable by an author/user.

The playback means 382 plays back the recorded actions selected by the playback selecting means, typically by simulating or animating the performance of the actions. Such simulation can be accompanied by sound, graphical, textual or other kinds of visual annotations to explain the actions being simulated.

Figure 10:
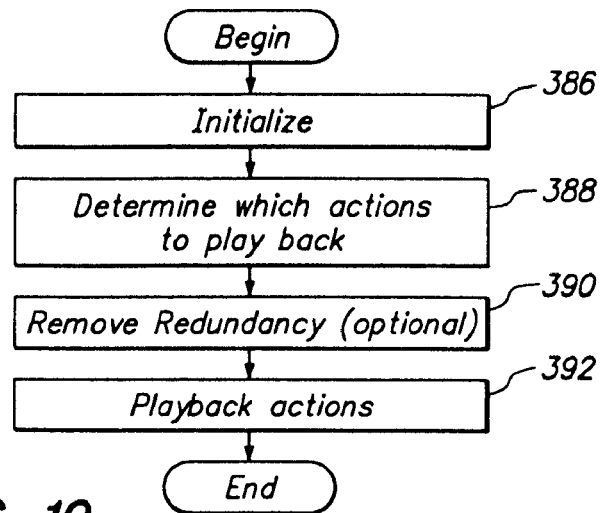
FIG. 10 is a flowchart generally illustrating the steps performed by the playback module of FIGS. 4 and 9.

FIG. 10 is a flowchart generally depicting the steps performed by the playback module. At block 386, initialization activities are performed to prepare for playback. Such initialization activities can include, but are not limited to, sorting the recorded actions list if it is unsorted and displaying a start state of the software title. Depending on the implementation of block 302 (FIG. 7), either a saved current state is displayed or the recorded actions are internally reversed until the starting state is reached and then the starting state is displayed.

At block 388, it is determined which actions are to be played back. In some cases, a user may specify criteria for determining which actions are to be played back. The specified criteria may be selected from a fixed set of criteria, or in some cases, may be arbitrarily inputted by the user. In other cases, a fixed non-user-selectable set of criteria is defined within the software tool. If any criteria are specified, then at block 388 the recorded actions that satisfy the criteria are identified.

Optionally, at block 390, redundant successive actions are summarized into a single action. At block 392, the recorded actions identified at block 388, as summarized at block 390, depending on the implementation, are played back.

Figure 11:
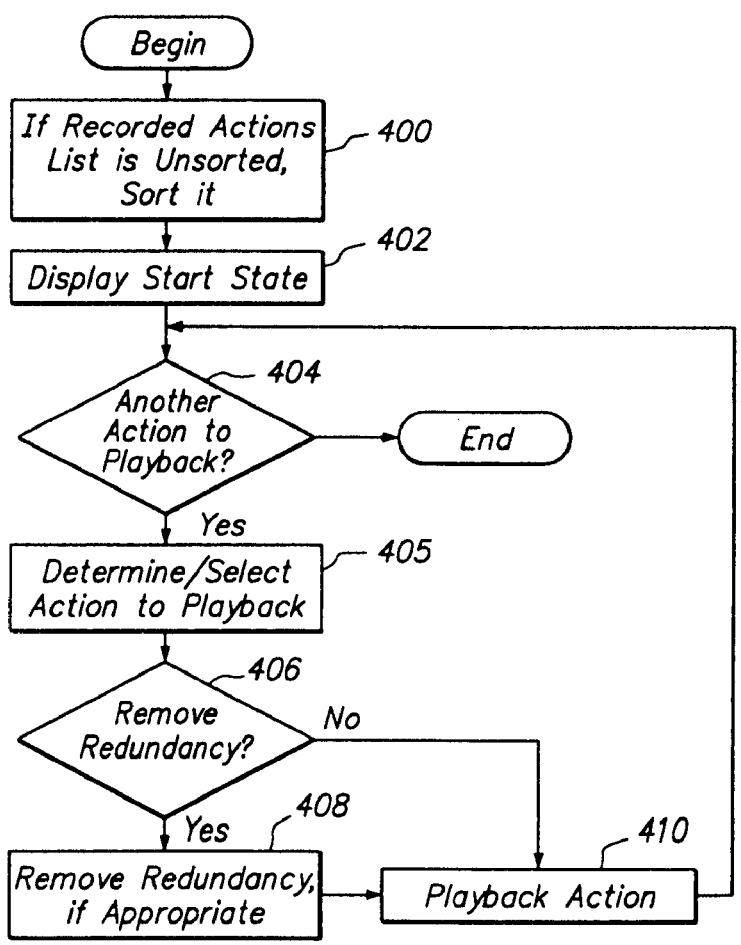
FIG. 11 is a flowchart more specifically illustrating the steps performed by the playback module of FIGS. 4 and 9.

FIG. 11 is a flowchart more specifically depicting the steps performed by the playback module. At block 400, if the recorded action list 350 is unsorted, then the list is sorted chronologically. At block 402, the state of the software title at block 302 (FIG. 7) of the recording process is displayed on the display screen. The actual implementation of block 402 depends on the implementation of block 302 (FIG. 7), i.e. whether a current state was stored. If at block 302 of the recording process a current state was saved, herein called the "saved state", then at block 402 the saved state is displayed on the display screen. If a current state was not saved at block 302 of the recording process, then at block 402, the actions to be played back are internally reversed to reach a state equivalent to the state that would have been saved at block 302. After completion of the reversal process, the resulting state is displayed on the display screen at block 402.

At block 404, it is determined whether there is at least one action to be played back, i.e. an action to be played back which has not yet been examined for playback. If so, then an action from the recorded actions list is identified as the next action to be played back, herein called the "current playback action".

At block 406, it is determined whether removal of action redundancy has been requested. If so, then at block 408, action redundancy, if any, is handled in such a way that block 408 outputs a current playback action. When redundancy is not found in block 408, current playback action that is output from block is the same as the current playback action identified at block 405. However, when redundancy is found in block 408, then the current playback action is a summary of the redundant actions, as explained in further detail below. At block 410, the current playback action is played back. If not, then at block 410, the action is played back and control returns to block 404. If so, then the action is not played back and control returns to block 404. If the action to be played back is not redundant, or if redundancy removal has not been requested, then at block 410, the action is played back and control returns to block 404. Blocks 406 and 408 are optional. If redundancy removal is not provided by the playback module, then control flows from block 404 to block 410.

The determination at block 404 is made using any list traversing mechanism appropriate for the implementation of the recorded actions list 350 (FIGS. 8A-8C). The recorded actions list 350 is traversed in a manner such that the order of event node traversal in the recorded actions list maps directly to the order of occurrence of the actions described by those nodes. For example, if during creation of a multimedia title an author performs events A, B and C in consecutive order and each of those events is recorded in the recorded events list, then the traversal mechanism traverses the event nodes of the recorded events list so that it encounters the event node for event A first, then the event node for event B and then the event node for event C.

A "current position" variable is typically maintained to reference a current position in the recorded actions list. This variable is initialized to the first occurring action and then updated, e.g., as actions are examined/played back. Thus, as the output of block 405, the variable typically references, either directly or indirectly, the next action to play back.

Preferably, the playback module can, upon user request, remove redundant events from the creation replay. Redundancy in events is defined as a consecutive sequence of the same or substantially similar events. For example, in moving an object on the display screen from location A to location E, an author may intermediately move the object to locations B, C and D. In some instances a user of creation replay is interested in each of the moves because even the intermediary moves may shed light on the creative process used by the author of the multimedia product. In other words, the user of creation replay may glean some understanding of the creative process by knowing that the author thought about moving the object to locations B, C and D, but ultimately chose location E to place the object. This type of user is likely to leave the redundancies in the creation replay.

Alternatively, the redundancies can be removed prior to the playback of any actions, e.g. prior to block 402. If redundancies are removed in this fashion, then block 408 is omitted.

In other instances, however, a user of creation replay is primarily concerned with the final outcome and is not interested in the intermediary steps leading to that outcome. That user, for example, is only interested in the fact that the object was moved from location A to location E and does not care that the author of the multimedia title considered placing the object in locations B, C and D. This type of user is likely to indicate that the redundancies be filtered out of the creation replay so that the user is unaware of them. This user would see a description of the object moving directly from location A on the display screen to location E.

Figure 12:
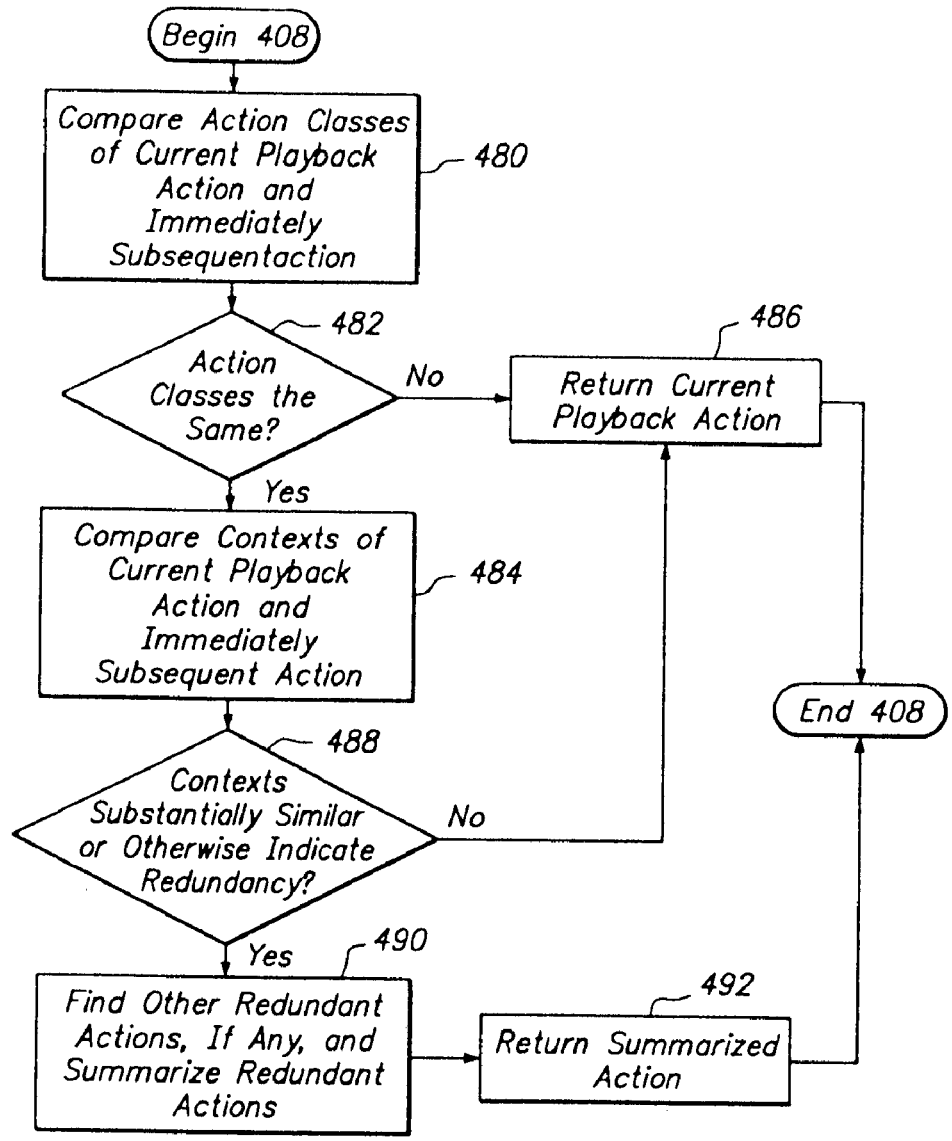
FIG. 12 is a flowchart generally depicting the steps performed at block 408 of FIG. 11.

Redundancies are typically filtered out of the creation replay in the following manner. FIG. 12 shows generally steps performed by a function which determines whether there is a redundancy and, if so, returns an action which is a summary of the redundant actions. At block 480, the current playback action is compared to the action which otherwise chronologically occurred immediately subsequent to it. If at block 482, the current playback action belongs to the same action class as the subsequent action, then control passes to block 484. Otherwise, at block 486, the function returns the current playback action.

At block 484, the context of the current playback action is compared with the context of the subsequent action. If at block 488, the contexts are sufficiently similar to be regarded as redundant, then at block 490, the actions in the recorded actions list are traversed in chronological order until an action is found which is not redundant with the current playback action. The redundant actions are then summarized and the summarized action is returned at block 494.

Depending on the implementation, the function further returns a reference to the action class node which was identified at block 490 as being non-redundant. This reference can be used to update the current position so that the non-redundant action is the action identified as the current playback action at block 405. Alternatively, depending on the implementation, the function accepts as input the current position and updates the current position as it traverses the recorded action list, returning a current position that references the last action in the redundancy. At block 405, the current position is then incremented so that the action following the redundancy is the next action played back.

The term "sufficiently similar" generally means that it is possible to summarize the actions into a single action. Typically, sufficiently similar actions have the same action class. Depending on the action class, the objects may or may not be the same. For example, for a delete object action class where several objects are deleted in immediate succession, rather than playing back each individual delete object action, the actions can be summarized into a single action in which several objects are shown to be deleted.

At block 490 the recorded actions list is traversed in a manner similar to that used at blocks 404 and 405 until a non-redundant event is found. The determination of redundancy performed at block 490 is similar to the determinations performed at blocks 480 through 488. Typically, for each action class there is a routine for summarizing redundant actions in that action class.

By providing a mechanism for the removal of redundancies in creation replay, the tool allows a user to customize the creation replay according to the user's needs or desires, by indicating that certain actions regarded as redundant need not be played back.

The playback of an action at block 410 of FIG. 11 depends upon several factors, including among others, the action class of the action, the capabilities of the computer system, the functionality of the tool, the manner in which an action class describes its playback, and/or user preferences, e.g. text only, text and animation. Preferably, a tool programmer creates descriptions for each of the action classes. These descriptions may include text, graphics, video, animation, sound, or a combination thereof. Depending on the embodiment of the invention, the tool programmer's description can be augmented by an author's description of particular events, e.g. the tool prompts an author for input as the actions are being performed.

Figure 13:
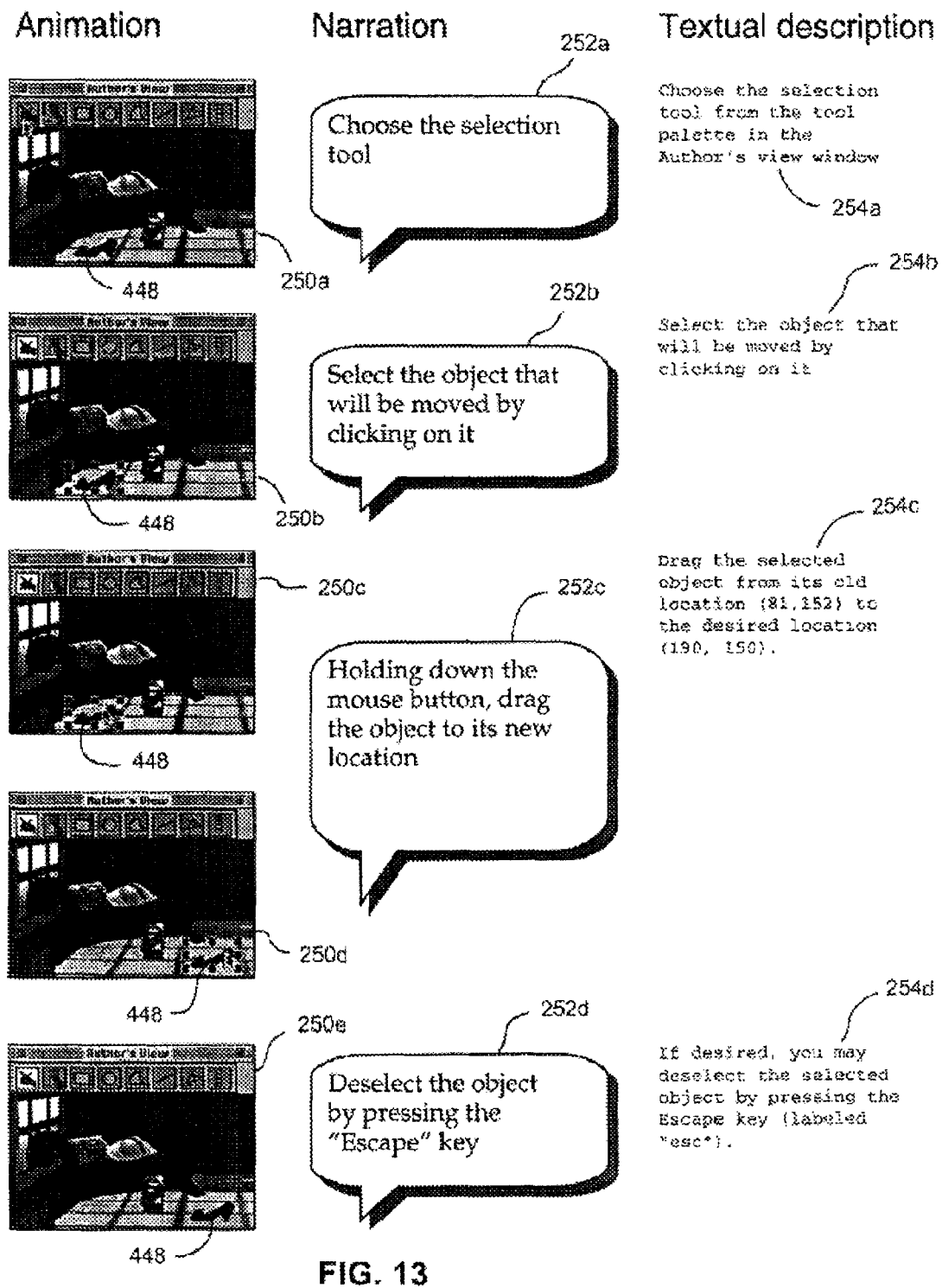
FIG. 13 depicts a playback of a move object action.

FIG. 13 illustrates a playback of an action of an object being moved from location A to location B in an embodiment of the invention which provides animation, text and narration during the playback. The action of moving an object includes the steps of choosing the selection tool, selecting the object to be moved, moving the object to the new location and deselecting the object. In the example shown in FIG. 13, a playback of a shoe object 448 being moved includes animations 250a-250e, narrations 252a-252d, and text descriptions 254a-254d.

At 250a, the choosing of the selection tool is animated. Accompanying the animation 250a, narration 252a and text description 254a are played and displayed, respectively. At 250b, the selection of the shoe object 448 is animated. Accompanying the animation 250b, narration 252b and text description 254b are played and displayed, respectively. At 250c, the pressing of the mouse button is animated and at 250d, the dragging of the shoe object 448 is animated. Accompanying animations 250c and 250d, narration 250c and text description 250d are played and displayed, respectively. At 250e, the deselection of the shoe object 448 is animated. Accompanying the animation 250e, narration 252d and text description 254d are played and displayed, respectively.

Depending on the embodiment of the inventions, the playback can include narration, text, animation, graphics, video or any other presentation format. The actual information provided in each presentation format depends on the implementation of the tool programmer and in some cases the input of the author, depending on the embodiment of the invention. For example, in embodiments which provide animation, narration, and text, in some cases the narration and text may each explain in detail the accompanying animation. In other cases, the narration may explain the accompanying animation in detail, while the text description provides alternative choices. Alternatively, the text can be written to a file or sent to a printer.

Figure 14:
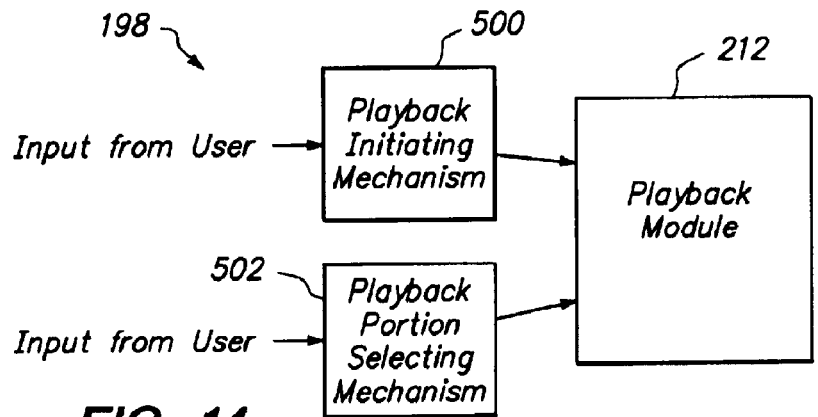
FIG. 14 is a block diagram generally illustrating the relationship between the user interface module and the playback module of FIG. 4.

Typically, the steps in FIGS. 10 and 11 are performed in response to a request, usually from a user of the authoring tool 136, to playback the creation of all or an indicated/selected portion of the multimedia product. As shown in FIG. 14, the authoring tool preferably includes as part of its user interface module 198 (FIG. 4) a playback initiating mechanism 500 which can be accessed by a user of the authoring tool or of a multimedia title to initiate the playback module. The initiating mechanism can be any user interface element capable of being invoked, e.g. button, or it can be any activating mechanism such as a keystroke, a mouse button action or voice-activation. Preferably, the authoring tool's user interface further provides a playback selection means 502 which a user can use to select or identify a particular portion of a multimedia product for creation playback.

Various mechanisms can be used to implement the playback selection means. In essence, any mechanism which allows a user to identify a portion of the multimedia product and select that portion for creation replay can be used. For example, in an object-oriented environment, the playback selection means preferably allows a user to indicate/select a particular object or objects in the multimedia product so that when the user initiates the creation replay triggering mechanism the creation playback is performed with respect to those selected object(s). The playback selection means typically includes a cursor control device, a voice-recognition mechanism or other mechanism for receiving user input.

In operation, in response to a user-operated recording initiating mechanism, actions are recorded during the development or modification of a software title or content. The recorded actions are stored in a recorded actions list in a manner that preserves their chronological order. Action classes which are to be recorded are typically specified in a action class list. Optionally, before any action is recorded, the software title is saved so that it may later be restored to the same condition.

In response to a user-operated playback initiating mechanism, the recorded actions are played back to the user in chronological order. Before replaying any actions, the software title's state prior to recorded actions is displayed on the display screen. Optionally, redundant actions are summarized into a single action so that a single summarized action is displayed in place of the redundant actions.

Figure 15:
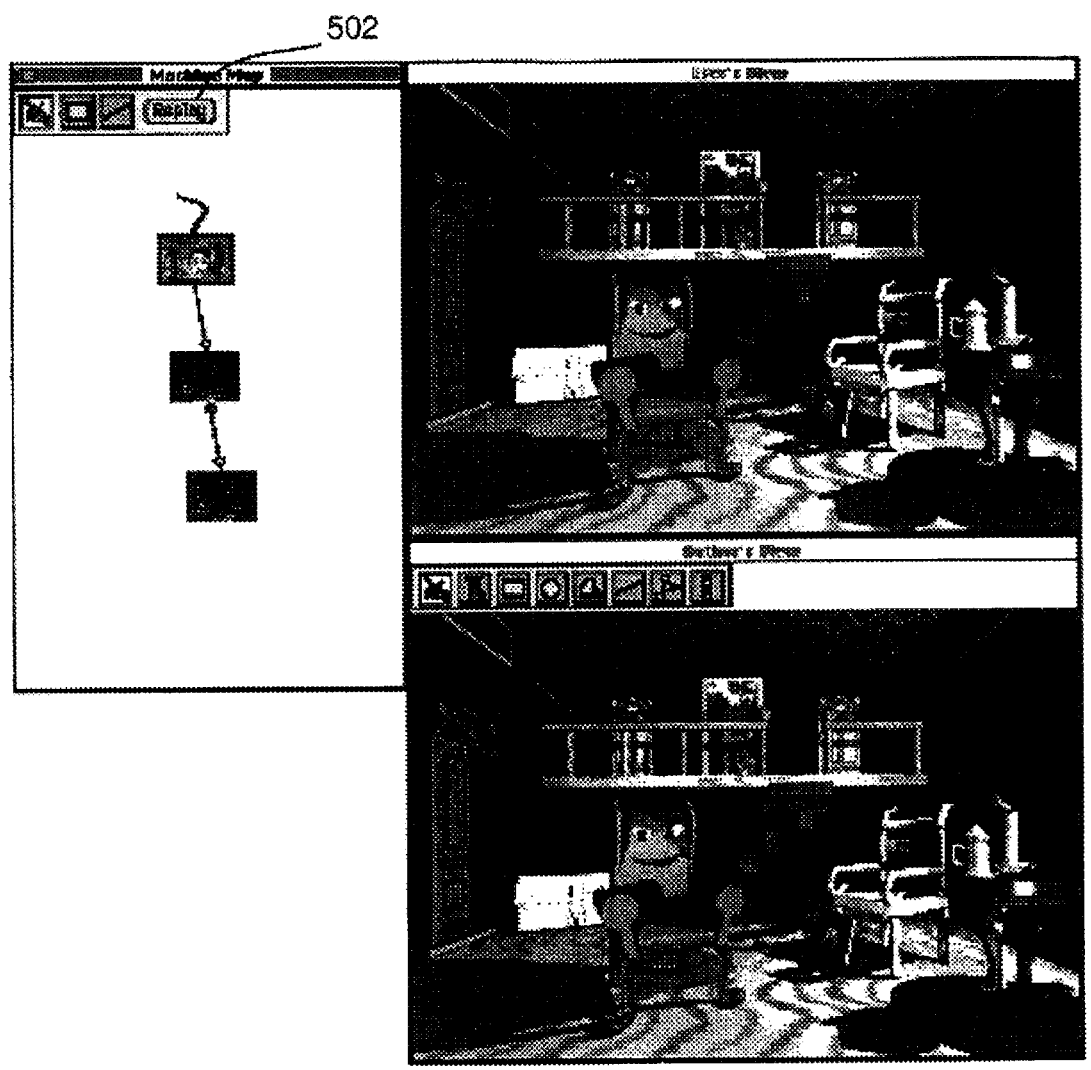
FIG. 15 illustrates a creation replay button.

As previously stated, co-pending patent applications, "An Authoring Tool Comprising Nested State Machines For Use In A Computer System" and "Method And Apparatus For Capturing Transient Events In A Multimedia Product Using An Authoring Tool On A Computer System", disclose an example of a tool in which the invention can be incorporated. FIG. 15 illustrates generally a user interface when the invention is incorporated into that tool.

A creation replay is typically initiated by a user's selection of the creation replay button 502. Selection of the creation replay button begins the playback of all or part of the recorded actions, as previously described in conjunction with FIGS. 10-12.

Alternatively, rather than having a creation replay button 502, a creation replay menu item is provided. In that case, selection of the creation replay menu item by the user initiates the playback of all or part of the recorded actions, as previously described.

Although the detailed description of creation replay has focused on its use in an authoring tool 136, it should be understood that creation replay can be incorporated into virtually any tool such that a user of the tool who has access to an end-product produced from the tool can use creation replay to learn about the creation/development process used to create that end-product. For example, creation replay can be incorporated into other editing tools such as word processors, draw programs or spreadsheets.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

APPENDIX A

```
-- PseudoCode example of user events (mouse and key events)
--   producing a recorded Action
--   Alan Peterson
--   Sept. 29, 1994
--   Copyright 1994, Apple Computer, Inc.
on mousedown of me (a TrasnitionEditorOKButton)
    CloseWithWritingChanges of my TrasnitionEditor
end mousedown
on keyDown of me (a TrasnitionEditor), theKey
    if theKey = return or theKey = enter then
        CloseWithWritingChanges of my TrasnitionEditor
    else if theKey = Escape then
        Close of my TrasnitionEditor
    else
        do inherited
end keyDown
on CloseWithWritingChanges of me (a TrasnitionEditor)
    Global EventRecorder --the recording object
    WriteChanges of me
    RecordEvent of EventRecorder, 'WriteChanges', me
    --notifying the recorder of writing the chagnes
    Close of me
end CloseWithWritingChanges
```

APPENDIX B

```
--PseudoCode example of user events (mouse and key events)
--   producing a recorded Action
--   Alan Peterson
--   Copyright 1994, Apple Computer, Inc.
--
--   note to the programmer: these examples assume a garbage collection model
--   of memory management. It goes without saying that if you are not working
--   in this kind of environment, you will have to properly dealocate the
--   objects/structures created.
on summarize (action1, action2)
    --assumes exiting function after "return" is executed
    if action1's actionClass = action2's actionClass then
        if action1's actionClass = 'DeleteObjects' then
            set action3 to new action
            set action3's actionClass to 'DeleteObjects'
            set action3's objects to (action1's objects & action2's objects)
            return action3
        else if (action1's actionClass = 'MoveObjects') and ¬
                (action1's objects = action2's objects) then
            set action3 to new action
            set action3's actionClass to 'MoveObjects'
            set action3's objects to action1's objects
            set action3's fromLoc to action1's fromLoc
            set action3's toLoc to action2's toLoc
            return action3
        end if
    end if
    return false
end summarize
on ReplayNextAction
    global ActionList, currentAction
    set ActionToReplay to currentAction
    repeat
        set summary to summarize(ActionToReplay,
            nextAction(ActionList, currentAction))
        if summary then
            set ActionToReplay to summary
            set currentAction to nextAction(ActionList,
```

APPENDIX B-continued

```
currentAction)
        else
            exit repeat
        end if
    end repeat
    Replay(ActionToReplay)
    set currentAction to nextAction(ActionList, currentAction)
end ReplayNextAction
```

We claim:

1. A method for recording and reviewing actions performed during development of software content created using a tool on a computer system having a processor and memory, said method comprising:

receiving user events during the development of the software content, wherein each of the user events is a low-level event generated by a peripheral device coupled to the computer system;

determining, automatically by the computer system in response to receiving the user events, which events and sequences of events constitute actions, wherein each determined action corresponds to a change in the software content and wherein at least one of the user events, by itself, does not correspond to a change in the software content;

determining, by the computer system, whether an explanation accompanies an action;

recording the determined actions during the development of the software content if a user preference specifies that the determined actions are to be recorded; and recording the determined explanations such that a recorded explanation of a recorded action is associated with the recorded action.

2. A method as defined in claim 1, said method further comprising:

receiving a user request for playback of recorded actions;

accessing recorded actions and associated recorded explanations; and playing back recorded actions and any associated recorded explanations.

3. A method as defined in claim 1, wherein said determining whether as explanation accompanies an action includes prompting a user for an explanation with respect to an action being recorded.

4. A computer-readable storage medium which stores instructions that, when executed by a system, cause the system to perform a method as in claim 1.

5. A computer-readable storage medium having stored thereon instructions for causing a computer to perform the following method comprising:

displaying a starting state of multimedia content;

determining automatically, by the computer, which recorded actions satisfy a specified criteria, wherein each recorded action corresponds to at least one user events and wherein each recorded action corresponds to a change in the multimedia content and wherein at least one of the at least one user events, by itself, does not correspond to a change in the multimedia content;

identifying automatically, by the computer, a plurality of redundant determined recorded actions;

summarizing automatically, by the computer, the plurality of redundant determined recorded actions to generate a summarized determined recorded action;

replacing automatically, by the computer, the plurality of redundant determined recorded actions with the summarized determined recorded action; and playing back a sequence of only those determined recorded actions in chronological order on an output device during a development of content.

6. The computer-readable storage medium of claim 5, wherein the specified criteria is a user specified criteria.

7. A computer-readable storage medium having stored thereon instructions for causing a computer to perform a method comprising:

receiving a user event during a development of content;

determining whether said received user event indicates a playback request; and if said received user event indicates a playback request, then determining automatically, by the computer, which recorded actions to play back by determining which recorded actions meet a specified criteria, wherein each recorded action corresponds to at least one user events and wherein each recorded action corresponds to a change in the content and wherein at least one of the at least one user events, by itself, does not correspond to a change in the content, identifying automatically, by the computer, a plurality of redundant determined recorded actions, summarizing automatically, by the computer, the plurality of redundant determined recorded actions to generate a summarized determined recorded action, replacing automatically by the computer, the plurality of redundant determined recorded actions with the summarized determined recorded action and playing back those determined recorded actions and if said received user event does not indicate a playback request, then determining whether there is an action to record and recording the action if it is determined that there is an action to record during the development of the content.

8. The computer-readable storage medium of claim 7, wherein the specified criteria is a user specified criteria.

9. A computer-readable storage medium having stored thereon instructions for causing a computer to perform the following method comprising:

receiving a user event during a development of content;

determining whether said received user event indicates a playback request; and if said received user event indicates a playback request, then determining automatically, by the computer, which recorded actions to play back by determining which recorded actions meet a specified fixed criteria, said fixed criteria being selectable from a plurality of fixed criteria, wherein each recorded action corresponds to at least one user events and wherein each recorded action corresponds to a change in the content and wherein at least one of the at least one user events, by itself, does not correspond to a change in the content, identifying automatically, by the computer, a plurality of redundant determined recorded actions, summarizing automatically, by the computer, the plurality of redundant determined recorded actions to generate a summarized determined recorded action, replacing automatically, by the computer, the plurality of redundant determined recorded actions with the summarized determined recorded action and playing back those determined recorded actions and if said received user event does not indicate a playback request, then determining whether there is an action to record and recording the action if it is determined that there is an action to record during the development of the content.

10. The computer-readable storage medium of claim 9, wherein the specified fixed criteria is a user specified fixed criteria.

11. A computer-readable storage medium having stored thereon executable computer program instructions, the executable computer program instructions including an action class list and, when executed by a digital processing system, causing the system to perform a method for playback of actions from the action class list, wherein:

the action class list comprises a plurality of action class description fields, each action class description field having a first field containing data which specifies a particular action class and a second field containing data which specifies a generic explanation of the action class specified in the corresponding first field, wherein the action class list is used during playback of actions, during a development of content, to identify, automatically, by the digital processing system, a plurality of redundant actions, wherein each action corresponds to at least one user events and wherein each recorded action corresponds to a change in the content and wherein at least one of the at least one user events, by itself, does not correspond to a change in the content, to summarize, automatically, by the digital processing system, the plurality of redundant actions to generate a summarized action, to replace automatically, by the digital processing system the plurality of redundant actions with a summarized action and to determine an explanation associated with the action class of each of the actions and to accompany the played back actions with the determined explanations.

12. A computer-readable storage medium as defined in claim 11 wherein said second field identifies a software routine capable of producing an explanation based upon properties of a recorded action.

13. A method for playing back actions recorded during development of content created using a tool on a computer system having a processor, memory and an output device, the tool having a user-selectable playback initiating mechanism for initiating the playback, said method comprising:

displaying a starting state of the content; and playing back recorded actions, during the development of the content, in chronological order on said output device, an action from said recorded actions comprising a sequence of events, wherein said events are selected to constitute said action based on a preset criterion and wherein each action corresponds to a change in the content and wherein at least one of the events, by itself, does not correspond to a change in the content, wherein a plurality of redundant actions are automatically replaced by the computer system with a summarized action and wherein the summarized action is played back instead of the plurality of redundant actions and wherein the summarized action is generated automatically by the computer system.

14. The method of claim 13, wherein:

at least one action from said recorded actions is accompanied by an explanation and said playing back further comprises playing back any associated recorded explanations along with recorded actions.

15. The method of claim 13, wherein the preset criterion is a user specified preset criterion.

16. A computer-readable storage medium having stored thereon instructions for causing a computer to perform the following method comprising:

displaying a starting state of content;

playing back recorded actions, during the development of the content, in chronological order on said output device, an action from said recorded actions comprising a sequence of events, wherein said events are selected to constitute said action based on a preset criterion and wherein each action corresponds to a change in the content and wherein at least one of the events, by itself, does not correspond to a change in the content, wherein a plurality of redundant actions are automatically replaced by the computer system with a summarized action and wherein the summarized action is played back instead of the plurality of redundant actions and wherein the summarized action is generated automatically by the computer system.

17. The computer-readable storage medium of claim 16, wherein:

at least one action from said recorded actions is accompanied by an explanation and said playing back further comprises playing back any associated recorded explanations along with recorded actions.

18. The computer-readable storage medium of claim 16, wherein the preset criterion is a user specified preset criterion.

19. An apparatus for playing back actions performed during development of content created using a multimedia creation tool on a computer system having a processor and memory, said apparatus comprising:

a user interface means for receiving user events, during the development of the content, receiving user requests for playback of actions and displaying recorded actions; and a playback module coupled to said user interface module for receiving user request for playback of recorded actions and for displaying playback of recorded actions, an action from said recorded actions comprising a sequence of events, wherein said events are selected to constitute said action based on a preset criterion and wherein each action corresponds to a change in the content and wherein at least one of the events, by itself, does not correspond to a change in the content, wherein a plurality of redundant actions is automatically replaced by the computer system with a summarized action and wherein the summarized action is played back instead of the plurality of redundant actions, said playback in response to such a user request playing back recorded actions and wherein the summarized action is generated automatically by the computer system.

20. The apparatus of claim 19, wherein:

at least one action from said recorded actions is accompanied by an explanation and said playing back further comprises playing back any associated recorded explanations along with recorded actions.

21. The apparatus of claim 19, wherein:

said playback is based on determining automatically which recorded actions satisfy a specified arbitrary criteria.

22. The apparatus of claim 19, wherein the preset criterion is a user specified preset criterion.

23. A method for recording and reviewing actions performed during development of content created using a tool on a computer system having a processor and memory, said method comprising:

receiving user events, during the development of the content;

determining, automatically by the computer system in response to receiving the user events, which events and sequences of events constitute actions; and recording the determined actions rather than recording the individual events constituting those actions, during the development of the content if a user preference specifies that the determined actions are to be recorded, wherein each action corresponds to a change in the content and wherein at least one of the events constituting an action, by itself, does not correspond to a change in the content.

24. A computer-readable storage medium having stored thereon instructions for causing a computer to perform the following method comprising:

receiving user events, during a development of content;

determining, automatically by the computer in response to receiving the user events, which events and sequences of events constitute actions; and recording the determined actions rather than recording the individual events constituting those actions, during the development of the content if a user preference specifies that the determined actions are to be recorded, wherein each action corresponds to a change in the content and wherein at least one of the events constituting an action, by itself, does not correspond to a change in the content.

25. The computer-readable storage medium of claim 24, wherein the operations further comprise:

determining whether an explanation accompanies an action; and recording the determined explanations such that a recorded explanation of a recorded action is associated with the recorded action if a user preference specifies that the action is to be recorded.

26. The computer-readable storage medium of claim 24, wherein:

said determining comprises determining which events and sequences of events constitute actions by applying one of a plurality of granularities, said one of a plurality of granularities being selected based on criteria, whereby said applied one of a plurality of granularities varies depending on the criteria.

27. The computer-readable storage medium of claim 26, wherein the criteria is a user specified criteria.

28. An apparatus for recording and reviewing actions performed during development of content created using a tool on a computer system having a processor and memory, said apparatus comprising:

a user interface means for receiving user events which occur during development of content; and a recorder module comprising hardware coupled to receive user events from said user interface means, said recorder module determining automatically in response to receiving the user events which events and sequences of events constitute actions and recording those actions, if a user preference specifies that those actions are to be recorded, said recorder module capable of recording an explanation for each individual action, said explanations being recorded in a manner which associates a recorded explanation of a recorded action with the recorded action, wherein each action corresponds to a change in the content and wherein at least one of the events constituting an action, by itself, does not correspond to a change in the content.

* * * * *

UNITED STATES PATENT AND TRADEMARK OFFICE
CERTIFICATE OF CORRECTION

| | | |
|---|---|---|
| PATENT NO. | : 7,721,264 B2 | Page 1 of 1 |
| APPLICATION NO. | : 09/844921 | |
| DATED | : May 11, 2010 | |
| INVENTOR(S) | : Alan R. Peterson et al. | |

It is certified that error appears in the above-identified patent and that said Letters Patent is hereby corrected as shown below:

In column 2, line 3, delete "tide." and insert -- title. --, therefor.

In column 6, line 48, delete "tides" and insert -- titles --, therefor.

In column 8, line 54, delete "Dannyh" and insert -- Danny --, therefor.

In column 9, line 14, delete "tide" and insert -- title --, therefor.

In column 11, line 30, delete "tide" and insert -- title --, therefor.

In column 11, line 53, after "art" insert -- . --.

In column 11, line 64, delete "tide" and insert -- title --, therefor.

In column 14, line 9, delete "tide" and insert -- title --, therefor.

In column 14, line 63, after "thereof" insert -- . --.

In column 18, line 52, delete "inventions," and insert -- invention, --, therefor.

In column 20, line 27, delete "chagnes" and insert -- changes --, therefor.

In column 20, line 41, delete "dealocate" and insert -- deallocate --, therefor.

In column 20, line 63, delete "summerize" and insert -- summarize --, therefor.

Signed and Sealed this
Twenty-first Day of February, 2012

David J. Kappos
*Director of the United States Patent and Trademark Office*